Dec. 15, 1936.  V. H. BURDICK  2,064,103
CAM ASSEMBLY FOR BRAKES
Filed Nov. 5, 1934  2 Sheets-Sheet 1

Inventor
Vincent H. Burdick
By Lyon & Lyon
Attorneys

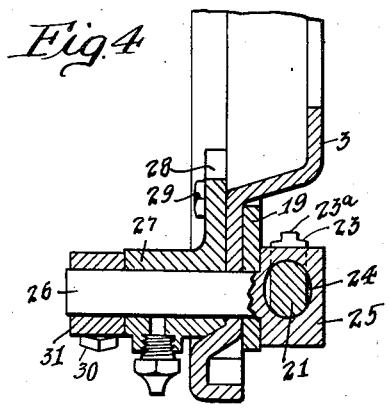
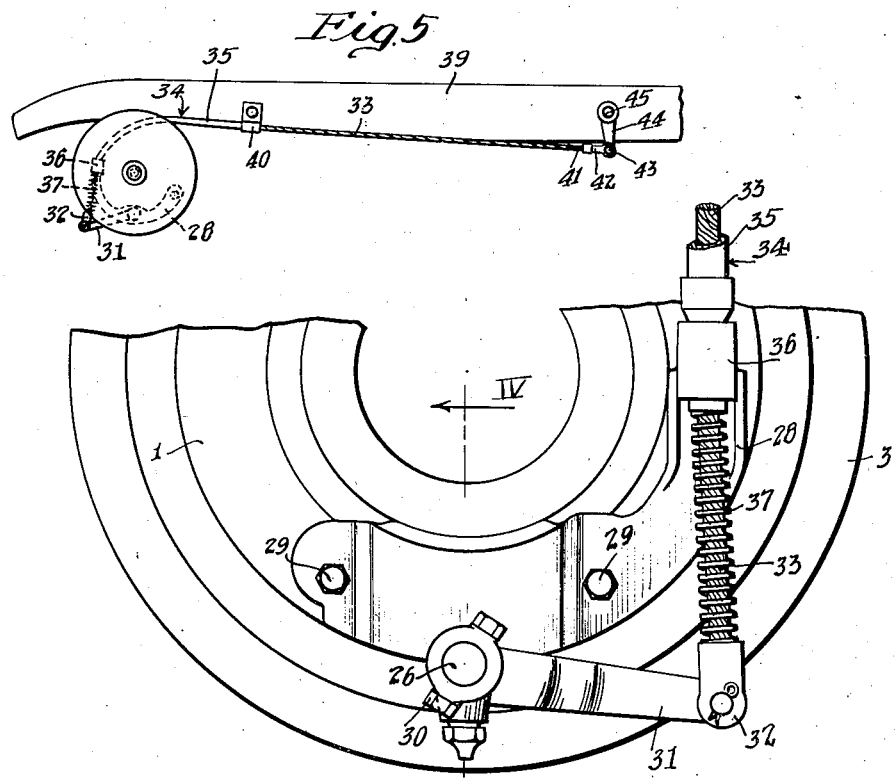

Patented Dec. 15, 1936

2,064,103

UNITED STATES PATENT OFFICE 2,064,103

CAM ASSEMBLY FOR BRAKES

Vincent H. Burdick, Gardena, Calif.

Application November 5, 1934, Serial No. 751,537

3 Claims. (Cl. 188—78)

This invention relates to brake mechanisms for automobiles and trucks and has to do particularly with a brake-actuating cam assembly adapted to replace a wedge assembly now employed in the front wheels on a widely used make of automobile. Certain features of the invention, however, are applicable to other types of brakes and may be advantageously incorporated in new brakes at the time of manufacture.

Automobiles of the make to which this invention is particularly applicable utilize internal expanding brakes comprising a pair of shoes juxtaposed to each other within a brake drum whereby the shoes, when they are separated from each other, bear against the inside surface of the drum; the shoes are supported at each end and may be moved toward or away from the adjacent drum surface by moving either end. A wedge or cam mechanism operated from the brake pedal of the automobile is provided to separate the two brake shoes at one end to apply the brakes, and a wedge operated by an adjusting bolt is provided to separate the opposite ends of the two brakes for adjustment purposes.

In the rear wheel brakes of this automobile, a cam mechanism, actuated by a rod from the brake pedal, is employed to separate the brake shoes to apply the brakes, and this cam mechanism has been found to be very satisfactory, applying sufficient force to the shoes to easily lock the wheels, if such action is desired.

In the front wheel brakes, however, because of the problem involved in coupling the brake shoe actuating mechanism to the brake pedal introduced by the pivotal mounting of the front wheels for steering purposes, the manufacturer has employed a wedge mechanism instead of a cam mechanism and has actuated the wedge through linkage involving a pair of levers on opposite ends of a rock shaft of substantial length (this rock shaft being pivotally supported parallel to and above the front axle). This front wheel brake-actuating mechanism is much less satisfactory than that employed in the rear wheels and definitely limits the braking effect that can be produced on the front wheels to a value much less than that to be desired. If an attempt is made to increase the braking force applied above definite limits, the rock shaft twists and fails to apply the increased force to the wedge. Furthermore, the coupling between the rock shaft and the wedge is of such a nature that application of the brakes tends to remove the weight of the automobile from the wheel bearing and apply it to the wheel through the wedge and brake shoes and the brake drum. This action frequently produces chattering of the brake because of the unavoidable play in the wheel bearing and in the steering spindle.

In accordance with the present invention, I improve the brake action of the front wheels of automobiles and trucks of the type described by substituting for the wedge mechanism and its actuating linkage a novel cam mechanism especially designed for attachment to the existing brake anchor plate and actuated by the brake pedal through a flexible cable independently of the connections between the wheel spindle and axle. I have found that with my attachment any desired braking force may be applied to the front wheels without producing chattering or other objectionable effects.

A broad object of the invention is to improve the efficiency of front wheel brakes of the type described.

Another object is to provide a substitute brake-actuating mechanism for brakes of the type described which mechanism may be readily and inexpensively installed on existing automobiles.

Another object is to provide in a brake of the type described a cam mechanism of improved efficiency.

The invention will now be explained in detail with reference to the accompanying drawings, in which Fig. 1 is an elevational view of an automobile brake of the type to which this invention relates, equipped with a cam mechanism in accordance with the invention, the view showing the major portion of the mechanism as it would appear with the brake drum and wheel removed; the portion of the brake drum with which the brake shoes engage being shown in section;

Fig. 3 is an elevation view of a portion of the inside surface of the brake anchoring plate of an automobile to which the invention relates, showing the manner of attachment of my mechanism;

Fig. 4 is a detailed sectional view, taken in the plane IV—IV of Fig. 3; and

Fig. 5 is a diagrammatic representation of a portion of the frame, together with the brake anchor plate of one front wheel, of an automobile of the type to which the invention relates, showing the manner of coupling my improved brake-actuating mechanism to the main brake-actuating cross-shaft of the automobile.

Figure 1:
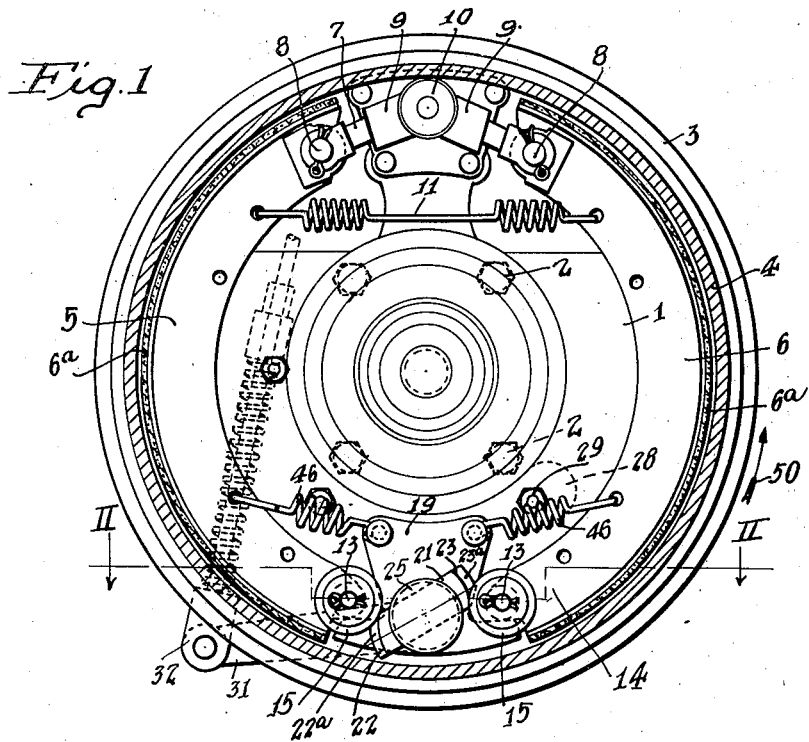

Referring to Fig. 1, the type of automobile brake to which this invention relates comprises a fixed brake anchor plate 1 which is rigidly attached as by bolts 2 to the axle of the automobile (not shown) on which it is mounted, this plate in its usual form having a peripheral edge 3 which is curved to fit around the inner edge of the associated brake drum 4 and form a rough seal therewith to prevent the entry of water, mud, and other foreign matter. Attached to the anchor plate 1 at the top and bottom are a pair of brake shoes 5 and 6, respectively, each brake shoe comprising a substantially rigid arcuate frame having a facing of brake lining 6a adapted to engage with the inner surface of the brake drum 4 when the brake is applied.

Each of the brake shoes 5 and 6 is supported at its upper end from the anchor plate 1 by a toggle 7 which is pivotally connected at its outer end by a pin 8 to the upper end of the brake shoe and is supported at its inner end in a guide 9, which is riveted securely to the anchor plate 1. The guides 9 restrict the vertical movement of the toggles 7 although permitting the latter to swing sufficiently to produce contact of the entire lengths of the shoes against the drum when the brakes are applied. The brake shoes 5 and 6 are normally maintained in tension toward each other, thus forcing the inner ends of the toggles 7 into contact with an abutting member within the housing 10, by a tensioning spring 11.

The lower end of each brake shoe 5 and 6 is provided with a transverse pin 13 which fits snugly in an aperture in the brake shoe reinforcing rib 14 and extends beyond the rib a substantial distance on either side. Each of the pins 13 serves to pivotally support a pair of rollers 15 (Fig. 2) which are positioned on each side of the rib 14, the pin 13 being provided with a head 16 on its inner end and a cotter pin 17 on the opposite end to prevent the rollers 15 from becoming detached. The heads 16 of the pins 13 ride on lugs or ears 18 on a plate 19 which is securely riveted to the anchor plate 1, the upper surfaces of the ears 18 functioning as guides to limit downward movement of the brake shoes 5 and 6.

As manufactured, the brake shoes of the brakes of the type described are separated to apply the brake by means of a wedge positioned to engage the rollers 15 on the two brake shoes, the wedge being forced downwardly by a mechanism which is well known and need not be described herein. This mechanism is fully described in, and further information thereon may be obtained from, the specification of Patent No. 1,850,006, granted to Henry Ford on March 15th, 1932.

Suffice it to say that in the brakes as manufactured the wedge referred to is guided by a bolt which extends through an aperture 20 in the plate 19 and anchor plate 1, this aperture 20 being positioned substantially midway between the rollers 15 on the lower ends of the brake shoes 5 and 6. The entire wedge assembly may be removed by removing the bolt referred to, and I then employ the aperture 20 through which the bolt passed for the entry of the actuating shaft of my substitute mechanism.

This substitute mechanism comprises a cam bar 21 having curved cam faces 22 and 23, respectively, adapted to engage the faces of the rollers 15 on the brake shoes 5 and 6, respectively. Each end of the cam is further provided with a tongue 22a and 23a which fits between the rollers 15, the tongues serving to guide the cam and maintain it in alignment with the rollers.

The cam bar 21 is slidably mounted in a passage 24 provided therefor in a hub 25 which is formed integrally with a shaft 26 which is extended through the aperture 20 previously referred to. On the inside (exterior with respect to the brake housing) of the anchor plate 1 the shaft 26 extends through and is journaled in a bearing member 27 which is formed integrally with a supporting bracket 28 (Fig. 3) shaped to fit snugly against the inside surface of the anchor plate 1 and adapted to be bolted rigidly thereto by bolts 29, (suitable small holes being drilled in the anchor plate to receive the bolts).

Shaft 26 projects beyond the end of the bearing member 27 and has secured thereto, by a bolt 30, a lever arm 31 which has attached thereto at its outer end a clevis 32 attached to the core member 33 of a flexible cable 34. The tubular or outer member 35 of the flexible cable is rigidly secured through an anchor terminal 36 to the bracket 28 and a helical spring 37 is provided about the extended end of the core member 33 between the clevis 32 and the anchor terminal 36 to normally urge the lever 31 into released position.

Figure 2:
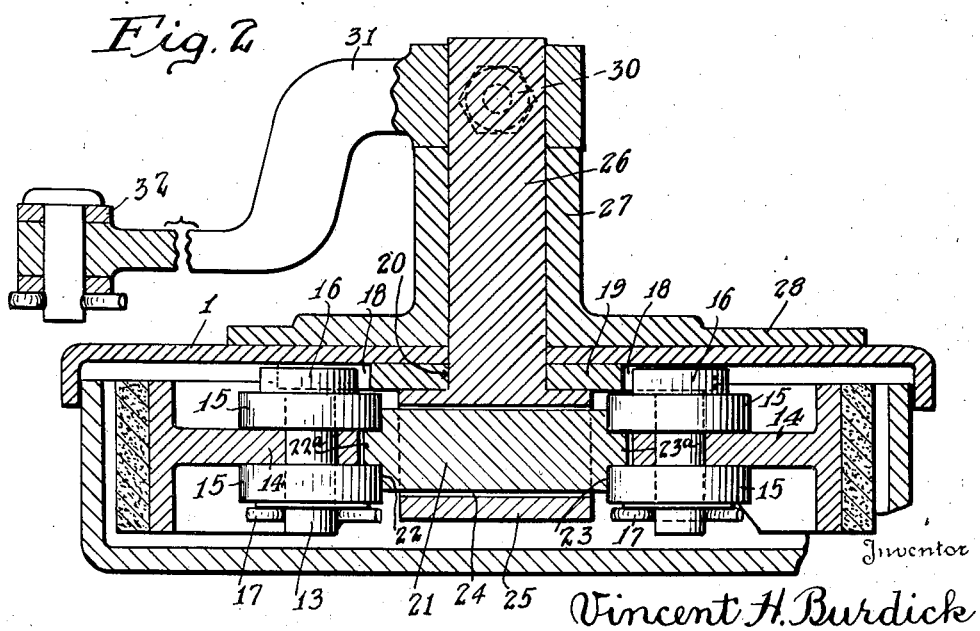
Fig. 2 is a detailed sectional view in the plane II—II of Fig. 1, showing the shaft and lever arm for actuating the cam mechanism.

The lever arm 31 is offset, as clearly shown in Fig. 2, to afford a better distribution of the strains with respect to the bearing member 27.

The mechanism described is assembled in the brake (following removal of the original wedge and wedge anchoring bolt) by first securing the bracket 28 to the anchor plate 1, care being taken to align the opening in bearing 27 with the hole 20 in the anchor plate formerly occupied by the wedge anchoring bolt. Thereafter, the shaft 26 is inserted through the aperture 20 in the brake anchor plate and the bearing member 27, from the outside, and then the lever arm 31 is slipped over the end of the shaft 26 and bolted in place.

The free end of the flexible cable 34 is connected as shown in Fig. 5. Thus the end of the outer or tubular member 35, which is much shorter than the core member 33, is anchored to the frame 39 of the automobile at a point adjacent the anchor plate by a bracket 40 bolted to the frame. The length of the cable 35 between the bracket 40 and the bracket 28 is sufficient, however, to afford the necessary flexibility for steering movement of the anchor plate 1. The core 33 of the flexible cable is extended beyond the bracket 40 and is secured, by a threaded shaft 41, on the end thereof, to the usual clevis 42 which is pivotally attached by a pin 43 to the lever arm 44 on the main brake actuating crossshaft 45 of the automobile.

It is to be understood that the automobile, as it is supplied by the manufacturer, comprises a brake rod extending from the clevis 42 to a lever arm on a rock shaft, previously referred to, mounted on the front axle. This brake rod is removed prior to the installation of the flexible cable control.

When the brake pedal (not shown) of the automobile is depressed, the cross-shaft 45 is rotated in a counterclockwise direction, thereby retracting the core 33 of the flexible cable and rotating the lever arm 31 in a counterclockwise direction (referring to Fig. 3). This rotates the shaft 26 in a clockwise direction (with reference to Fig. 1 of the drawings), and swings the cam bar 21 to separate the rollers 15 on the brake shoes, this motion being in turn transmitted to the shoes and forcing them outwardly against the brake drum. When pressure is removed from the brake pedal the entire assembly is restored to normal position by springs 46 (Fig. 1) which retract the lower ends of the brake shoes 5 and 6, and the spring 37 (Fig. 3) surrounding the end of the core member of the flexible cable.

It will be observed from a close inspection of Figs. 1 and 4 that the passage 24 in the hub 25 for slidably supporting the cam bar 21 is eccentrically positioned with respect to the axis of the shaft 26. I have found that this eccentric positioning of the cam bar with respect to its actuating shaft affords a substantial improvement in the brake action. The reason for this improvement will be apparent from an analysis of the brake action. Thus, referring to Fig. 1, which is an elevation view of the brake mechanism in the left front wheel, it will be observed that during forward movement of the automobile the drum 4 revolves in the direction indicated by the arrow 50. Following initial rotation of the cam bar 21 and the resultant separation of the brake shoes 5 and 6, the brake shoe 6, when it contacts with the drum 4, will tend to move upwardly with the adjacent portion of the drum. Looked at in another way, the friction between the drum and the brake shoe 6 tends to set the shoe. Of course, the extent of upward movement is limited to a definite value by the toggle 7 on the upper end of shoe 6. Nevertheless shoe 6, because of the drag produced on it by the drum, tends to revolve with the drum to a greater extent than shoe 5 because the drag of the drum on shoe 5 tends to carry the latter downward and rearwardly against the cam bar 21.

It will be apparent, therefore, that the cam bar should be designed to move the rollers 15, associated with the shoe 6, to a greater extent than the rollers associated with the shoe 5, and furthermore, that less force will be required to move the shoe 6 than that required to move the shoe 5, because the brake friction is tending to aid the movement of the shoe 6, whereas it is opposing movement of shoe 5. Theoretically, the floating mounting of the cam bar 21 in the hub 25 is supposed to compensate for unequal movement of the two brake shoes, the bar sliding within the hub to effect the necessary equalization. Actually, however, the friction between the bar 21 and the walls of the passage in hub 25 is so great that it is doubtful if there is actually much movement of the bar within the hub during the setting of the brakes.

By mounting the bar 21 eccentrically with respect to the hub 25 and shaft 26, I readily produce the desired increased movement of shoe 6 with respect to shoe 5, without necessitating any compensating movement of the bar 21 within the hub 25, during the setting of the brake. Thus it will be observed from Fig. 1 that by virtue of the eccentric mounting of the bar 21 the entire bar swings away from the shoe 5 and toward the shoe 6 in response to clockwise rotation of the hub 25. The eccentric mounting of the bar has been found in actual practice to increase the power and smoothness of action of the braking mechanism.

I am fully aware that unsymmetrical, rigid cams have been employed by others for effecting a greater movement of the primary brake shoe than of the secondary brake shoe (it is customary to refer to the brake shoe 6 as the primary shoe and the brake shoe 5 as the secondary shoe) but the present invention is a distinct improvement on those arrangements for the reason that it permits the use of a symmetrical sliding cam bar of the type previously employed by the manufacturer of the automobile for which my attachment is intended in the rear wheel brakes of the automobile, while affording the advantage of the unsymmetrical cam structures used by others.

Having fully described the preferred embodiment of this invention, it is to be understood that I do not limit myself to the exact construction herein set forth, which may obviously be varied in detail without departing from the spirit of this invention, but only as set forth in the appended claims.

I claim:

1. A substitute front wheel brake-actuating mechanism for an automobile wheel brake of the type described having a brake anchor plate with an aperture therethrough for mounting a wedge anchoring bolt which aperture is positioned between the lower ends of a pair of brake shoes having actuating rollers thereon; said mechanism comprising a bracket shaped to fit against the exterior face of the anchor plate and having therein a bearing juxtaposed to the wedge anchoring bolt aperture in the anchor plate, a rock shaft journaled in said bearing and projecting therebeyond at each end, the outer end of said shaft being dimensioned to pass through and fit snugly in the said bolt aperture in the anchor plate and having a cam thereon shaped to cooperate with the rollers on the brake shoes for separating the latter in response to rotation of said shaft, the inner end of said shaft having a lever arm mounted thereon for rocking said shaft, and a flexible cable for connecting said lever arm to the brake-actuating lever on the main brake cross-shaft of the automobile.

2. A mechanism as described in claim 1, in which said cam comprises a hub on the outer end of said shaft, said hub having a passage extending therethrough in a plane perpendicular to the axis of said shaft, a cam bar slidably fitted in said passage and having oppositely inclined similar cam faces on its two ends for engaging respectively with the rollers on said two brake shoes, said passage being eccentrically disposed with respect to the axis of said shaft, whereby a given rotation of said shaft in a direction to spread said brake shoes results in a greater movement of that end of the cam bar actuating the rear shoe than of the opposite end of the cam bar which actuates the front shoe.

3. A brake structure comprising in combination a rotatable drum to be retarded, a pair of arcuate brake shoes for retarding the drum oppositely disposed within said drum, means for pivotally supporting one end of one shoe, means for pivotally supporting the adjacent end of the other shoe, a cam follower on the opposite end of each shoe, said followers being juxtaposed to each other, a brake-actuating hub symmetrically positioned between said followers and adapted to be rotated about its axis to set said brake shoes, said hub having a transverse passage therethrough, a cam bar slidably fitted in said passage and having oppositely inclined cam faces on its two ends for contacting said respective followers on the two brake shoes and urging them apart in response to rotation of said hub; in which said passage is eccentrically disposed with respect to the axis of rotation of said head, the radius of eccentricity being in such a direction with respect to the direction of rotations of said head and of said drum as to cause a greater movement of the follower on the primary shoe than of the follower on the secondary shoe, in response to rotation of said head.

VINCENT H. BURDICK.